Patented Dec. 8, 1953

2,662,013

UNITED STATES PATENT OFFICE 2,662,013

DIAZOTYPE PHOTOPRINTING MATERIAL

John Sulich, Jr., Endicott, and Joseph E. Frederick, Johnson City, N. Y., assignors to General Aniline & Film Corporation, New York, N. Y., a corporation of Delaware No Drawing. Application July 18, 1951, Serial No. 237,488

12 Claims. (Cl. 95—8)

This invention relates to improved diazotype photoprinting material and a process for preparing it.

According to application Serial No. 783,220 of October 30, 1947, now Patent No. 2,566,709, diazotype photoprinting material prepared by comingling colloidal silica with the diazotype sensitized composition in the light-sensitive layer yields copies of improved density, definition, light-fastness and stability to background discoloration. The colloidal silica can be deposited on the base material, especially paper, by precoating with an aqueous dispersion of the silica and drying before sensitization, or dispersed colloidal silica can be included in the sensitizing solutions such that sensitization and silica coating can be effected in a single step.

It has also been suggested to employ resins or semi-resinous compositions such as condensation products of dicyandiamide, melamine, guanidine, biguanides and the like with formaldehyde in diazotype layers to improve their stability to decomposition on storage, and fastness to washing of the image. Such resins are employed for this purpose, for example, in application Serial No. 68,726 of December 31, 1948, now Patent No. 2,593,911. Water-soluble binders or sizes such as casein and vegetable protein are commonly employed in surface coatings for paper manufacture and the resulting paper can also be used, after appropriate sensitization, as diazotype photoprinting material.

Finely divided silica of non-colloidal dimensions, obtained, for example, by dehydration at elevated temperature of silicic acid, precipitated from aqueous solutions, e. g. by acidification of alkali metal silicates, followed by grinding and grading of the silica, e. g. by levigation or air floating processes, as well as dehydrated silica gel produced by other procedures, has been used as a pigment in surface coatings together with sizing materials for paper.

When it is attempted to substitute non-colloidal silica for the colloidal silica in the process of application Serial No. 783,220, above mentioned, the silica coating and the image coloration rub off the base material on contact with other objects. On the other hand, combination of film-forming binder materials or sizes such as casein or water-soluble resins with colloidal silica as a precoating composition for a paper base material, prior to sensitization with diazotype materials, substantially nullifies the effect of the colloidal silica since it becomes completely embedded in the layer of the binder.

We have discovered, however, that, upon precoating a base material such as paper with a combination (in proportions hereinafter specified) of finely divided non-colloidal silica and a hydrophilic binder which is reactive toward the azo coupling component employed in diazotype sensitizing compositions, and after drying, sensitizing with a solution containing an azo coupling component and a light-sensitive diazo compound, the photoprinting material thus obtained yields greatly increased image density superior to that obtained with colloidal silica or with the film-forming binder material alone. The photoprinting material and resulting copies are not subject to crocking and show, in addition to the greatly improved image density, improved fastness to washing, excellent line definition, and stability to background discoloration and decomposition on storage. The combination of the binder with the finely divided silica provides an especially smooth and attractive surface on the copies, and backgrounds of exceptional whiteness.

The finely divided non-colloidal silica employed in this invention has a particle size range substantially from 0.1 to 10 microns (in terms of principal transverse dimension of the particles) and having an average particle size (based on quantity by weight of the particles) of not substantially less than 1 nor more than 5 microns, and preferably from 2 to 4 microns. The major portion by weight of the particles are preferably between 1 and 5 microns. While the lower limit of 0.1 micron specified above is the approximate threshold of the colloidal range, the finely divided silica employed does not contain any substantial proportion of colloidal particles in view of the specified average particle size range. Particles above 10 microns are avoided, since they produce undesirable roughness in the coating. Heavy metal impurities such as iron oxides or salts are preferably avoided, since these tend to cause discoloration when in contact with components of the diazotype sensitizing composition.

Binding materials employed in the silica coating composition according to this invention are materials reactive toward coupling components containing phenolic or enolic hydroxyl groups, as well as those containing, in addition, acidic substituents such as sulfonic acid or carboxyl groups. They are film-forming lyophile (i. e., water-soluble) colloids having alkaline to amphoteric properties and because of this, are adapted to combine with acid-reacting materials. The binder materials are especially the natural and artificial nitrogenous polymers such as casein, alkali-soluble vegetable protein (e. g. soya protein), gelatine, glue, and water-soluble condensation products of lower aldehydes (especially formaldehyde) with organic bases such as dicyandiamide, guanidine, guanyl ureas, biguanides, and melamine. Other water-soluble film-forming synthetic polymers of the condensation or addition type containing basic amino groups or basic tertiary nitrogen atoms can be similarly employed. Synthetic resins containing basic nitrogen atoms or amino groups, suitable for use as binders in accordance with this invention are in the nature of anion exchange resins. These binders, when employed together with finely divided silica in the coating applied to a base material, prior to sensitization with a diazotype sensitizing composition, apparently combine with, and anchor, the azo coupling components and the image-forming azo dyes produced therefrom in the light-sensitive layer. In this way, they render the image fast to washing and avoid color shift due to migration of different coupling components when several of these are included in the sensitizing composition to produce a composite color, e. g. a black line diazotype image.

In order to obtain the surprising increase in image density afforded by this invention, the weight ratio of silica to binder in the coating composition applied to the base before diazotype sensitization is from 1:1 to 3:1. Within this range, the concentration of the binder and silica in the aqueous slurry employed for coating the base can be varied over a relatively wide range depending upon the loose or tight quality of the base material, the viscosity produced by the binder in the silica suspension, and the requirements of the coating equipment used for application of the slurry to the base. The concentration of the aqueous silica and binder coating composition is so selected, and the slurry applied in such manner to the base material, as to produce on drying, a smooth, even, continuous surface of silica particles on the base. Compositions of higher concentration and viscosity are generally desirable when paper base material of relatively loose, open texture is to be used, while less concentrated and less viscous compositions are best adapted for paper of relatively tight characteristics. In general, the concentration of the binder in the aqueous solution in which the silica is suspended varies from 1 to 10% by weight, the amount of the silica being related to the amount of binder in the proportion ranges specified above.

The silica suspension in the binder solution can be applied to a paper base material by methods commonly used in paper coating. It is advantageous to maintain uniformity of the slurry during coating by agitation. An air brush or a doctor blade can be used to insure uniform distribution of the coating composition. After coating, the coated base material is dried.

The silica precoated base material is then sensitized for diazotype reproduction by application thereto of a two-component diazotype sensitizing composition, containing a light-sensitive diazo compound and an azo coupling component, the combination being stabilized against coupling prior to development, and adapted to yield an azo dye coloration on suitable development, especially by alkaline treatment, particularly by exposure to gaseous ammonia.

Suitable light-sensitive diazo compounds are generally diazotized p-phenylenediamine compounds, in which one of the amino groups is preferably protected against diazotization and the other is converted by reaction with a nitrite in acid medium to a diazonium radical. The resulting light-sensitive diazo compounds can be advantageously employed in the form of stable salts such as the sulfate, chlorobenzene-sulfonate or borofluoride, or in the form of stable complex double salts of the diazonium compound with complex-forming metal salts such as zinc chloride, cadmium chloride or stannic chloride.

Azo coupling components suitable for use in the diazo-type sensitizing compositions are, especially, phenols, naphthols and enolic compounds such as pyrazolones or acylacetarylides, which may contain, in addition, acidic water-solubilizing groups such as sulfonic or carboxylic acid groups.

The light-sensitive diazo component and azo coupling component can be applied simultaneously or successively in either order, usually in the form of an aqueous solution, to the silica-binder precoated surface of the base material to form the light-sensitive surface layer. Advantageously, the sensitizing compositions further include stabilizing agents such as citric, tartaric, tri-carballylic or boric acids and salts such as zinc chloride, cadmium chloride or nickel sulfate to prevent premature coupling of the image-forming diazo and azo coupling components; anti-oxidants such as thiourea or thiosinamine, to improve the stability of the resulting material to background discoloration; penetration assistants such as a lower alcohol, e. g. methanol, ethanol or isopropanol; and humectants (i. e., water-absorbent components) such as glycol, glycerine, propylene glycol or dextrin.

Preparation of the diazotype photoprinting material in accordance with the invention is illustrated in the following examples, wherein parts and percentages are by weight unless otherwise specified.

*Example 1*

Paper base material is uniformly coated with a slurry of finely divided silica suspended in an aqueous solution of a nitrogenous water-soluble film-forming resin obtained by condensing dicyandiamide and ammonium chloride with formaldehyde in concentrated aqueous solution at temperatures from 80° to 100° C., the molar ratio of the three reagents being 0.6:0.3:1.0. The weight ratio of silica to the resin is 5:4 and the concentration of total solids (silica and binder) in the aqueous slurry is between 5 and 17.5%. The slurry is applied in sufficient amount per unit area to produce a substantially continuous, smooth surface layer of silica particles intermingled with binder, and the coated paper is then dried. The silica employed is a finely divided dehydrated silica gel having a particle size range substantially from 1 to 10 microns and a weight-average particle size from 2 to 4 microns.

A diazotype sensitizing solution is prepared by dissolving the following ingredients in 60 parts of water and then diluting with sufficient water to render the volume equal to that of 100 parts of water:

1.8 parts N,N-diethylaniline-p-diazonium chloride-$ZnCl_2$ double salt
0.1 part acetoacetanilide
0.4 part resorcinol
1.6 parts 2,3-dihydroxynaphthalene-6-sulfonic acid
5.5 parts ethylene glycol
0.8 part isopropanol
6.5 parts citric acid
5.0 parts zinc chloride
0.1 part saponin The silica precoated surface layer is impregnated with the sensitizing solution, and dried while protecting the material from actinic light.

When exposed to actinic light under a translucent original having an opaque positive image to be reproduced, and then developed by exposure to aqueous ammonia, a positive copy is obtained having a black azo dye image on a white background. The image is of uniform intense black color having excellent definition and showing complete absence of migration of the azo coupling components in the layer. In addition, the image has excellent fastness to washing and light, and the white background is stable to discoloration on exposure to light and atmosphere.

A comparison of the image density produced under standard developing conditions of the material obtained in this example with that of a control material prepared by similar sensitization of the paper base material, but without the silica-binder precoat, shows that the material of this invention has an image density 25 to 30% stronger than the control material. If the base material is precoated before sensitization with the finely divided silica alone or with the nitrogenous resin binder alone and similarly sensitized and developed, an increase in image density occurs but it is of the order of 10% rather than the 25 to 30% obtained with the material of the invention.

*Example 2*

Paper base material is uniformly coated with a suspension of 6 parts of finely divided silica of the nature employed in Example 1, having a particle size range of 0.1 to 10 microns and a weight average particle size of 2 to 4 microns, in a solution of 2.5 parts of sodium caseinate in 100 parts of water, the amount of the coating composition per unit area being such as to produce a substantially continuous, thin layer of silica particles on the surface of the base material. After drying, the silica-casein precoated surface is sensitized with a diazotype sensitizing solution having the following composition:

2.0 parts N,N-dimethylaniline-p-diazonium chloride
5.0 parts zinc chloride
3.0 parts 2,3-dihydroxynaphthalene-6-sulfonic acid
5.0 parts citric acid
4.0 parts thiourea
5.5 parts ethylene glycol
0.1 part saponin
100.0 parts water After drying, copies were prepared by exposure of the material to light under an original similar to that employed in the preceding example, and developed by exposure to gaseous ammonia. A deep blue image was produced on a clear white background. The image density, as compared to that produced in the absence of the casein-silica precoat shows an increase of the same order as that noted in the preceding example. The copies are characterized by excellent definition, fastness to light and washing, and have a smooth white background, stable to discoloration on exposure to light and air.

Instead of the nitrogenous binder materials of the foregoing examples, there can be used other water-soluble resins obtained by condensation of formaldehyde with dicyandiamide, guanidine, guanyl ureas, biguanides, and melamine, water-soluble polyvinyl resins containing basic amino groups or heterocyclic nitrogen atoms, and other anion exchange resins containing basic nitrogen atoms in their structure. Further, other water-soluble casein salts, water-soluble soya protein, protein, gelatin, globulines, glutelines and nucleoproteids can be used as binders.

The weight ratio of silica pigment to binder varies from 1:1 to 3:1. Optimum image densities are generally obtained at a particular ratio within the aforesaid range depending upon the particular binder employed. The ratios employed in the foregoing examples represent conditions for obtaining substantially optimum image density with the binders employed.

Instead of the light-sensitive diazo compounds of the examples, others can be substituted obtained, for example, by diazotization of the following amines:

p-Amino-diphenylamine
p-Phenylenediamine-monosulfo acid
N - $\beta$ - hydroxyethyl - N - methyl - p - phenylenediamine
N - $\beta$ - hydroxyethyl - N - ethyl - p - phenylenediamine
p-Ethylamino-m-toluidine
p-Diethylamino-aniline
p-Dimethylamino-aniline
N-benzyl-N-ethyl-p-phenylenediamine
p-Dimethylamino-o-toluidine
p-Diethylamino-o-phenetidine
4-benzoylamino-2,5-diethoxyaniline
2-amino-5-dimethylamino-benzoic acid
N,N - di - ($\beta$ - hydroxyethyl) - p - phenylenediamine
p - (N - ethyl - N - $\beta$ - hydroxyethylamino) - o-toluidine
p-Di-$\beta$-hydroxyethylamino-o-chloroaniline
p-Ethylamino-aniline
p-Phenylenediamine
2,5-diethoxy-4-(4'-ethoxyphenylamino)-aliline Diazonium compounds obtained from the foregoing amines can be employed in the form of their stable diazonium sulfates, chlorobenzene sulfonates or borofluorides, or in the form of the double salts of the diazonium chloride with zinc chloride, cadmium chloride or stannic chloride.

Azo coupling components suitable for use in the sensitizing compositions or in the diazotype light-sensitive layer include, in addition to those of the examples:

1-(sulfophenyl)-3-methyl-pyrazolone-5
p-Sulfo-acetoacetanilide
1,8-dihydroxynaphthalene-3,6-disulfonic acid
1 - benzoylamino - 8 - hydroxynaphthalene - 3,6-disulfonic acid
Resorcinol
Resorcinol-5-sulfonic acid
Phloroglucinol
Phloroglucinol carboxylic acid
2,2',4,4'-tetrahydroxy-biphenyl
2,4,4'-trihydroxy-biphenyl-2'-sulfonic acid
2-naphthol-3,6-disulfonic acid The foregoing coupling components can be employed alone, or in various combinations of two or more to obtain desired image coloration. Despite the use of coupling components containing water-solubilizing sulfonic or carboxylic acid groups, the image colorations produced are of excellent fastness to washing by reason of the reaction of these acidic materials with the basic-to-amphoteric nitrogenous colloids employed as binders in precoating the base material according to this invention.

For most purposes, the base material employed is paper. However, other material such as cardboard, plastic film, cloth, metal or glass can also be precoated with a suspension of finely divided non-colloidal silica and binder, dried, and sensitized in accordance with the invention, the resulting materials having similar advantages in increased image density, excellent definition, fastness to washing, absence of background discoloration, and smooth white appearance.

Variations and modifications which will be obvious to those skilled in the art can be made in the foregoing procedures without departing from the scope or spirit of the invention.

We claim:

1. A process for preparing diazotype photoprinting material, which comprises precoating a base material with a suspension of non-colloidal finely divided silica in an aqueous solution of a film-forming lyophile basic-to-amphoteric nitrogenous polymeric binder capable of reacting with an azo dye coupling component containing a hydroxyl group selected from the class consisting of phenolic and enolic hydroxyl groups, the weight ratio of the silica to said binder in said suspension being from 1:1 to 3:1, said finely divided non-colloidal silica being dehydrated silicic acid precipitated from aqueous solution, having a particle size range of 0.1 to 10 microns and a weight average particle size of 1 to 5 microns, drying the coating, and impregnating the resulting coated surface with a two-component diazotype sensitizing composition containing a light-sensitive diazo compound and an azo coupling component containing a hydroxyl group selected from the class consisting of phenolic and enolic hydroxyl groups.

2. A process as defined in claim 1, wherein the binder is a water-soluble film-forming synthetic nitrogenous anion exchange resin.

3. A process as defined in claim 1, wherein the binder is a water-soluble film-forming protein compound.

4. A process for preparing diazotype photoprinting material, which comprises precoating a paper base material with a suspension of non-colloidal finely divided silica in a 1 to 10% aqueous solution of a film-forming lyophile basic-to-amphoteric nitrogenous polymeric binder capable of reacting with an azo dye coupling component containing a hydroxyl group selected from the class consisting of phenolic and enolic hydroxyl groups the weight ratio of silica to said binder in said suspension being from 1:1 to 3:1 and the combined amounts of binder and silica being 5 to 17.5% of the aqueous suspension, said finely divided non-colloidal silica being dehydrated silicic acid precipitated from aqueous solution, having a particle size range from 0.1 to 10 microns and a weight average particle size of 2 to 4 microns, drying the coating and impregnating the resulting coated surface with a two-component diazotype sensitizing composition containing a light-sensitive diazo compound and an azo coupling component containing a hydroxyl group selected from the class consisting of phenolic and enolic hydroxyl groups.

5. A process of preparing diazotype photoprinting material, which comprises precoating a paper base material with a suspension of non-colloidal finely divided silica in a 1 to 10% aqueous solution of an alkali metal casein salt, said salt being capable of reacting with an azo dye coupling component containing a hydroxyl group selected from the class consisting of phenolic and enolic hydroxyl groups the weight ratio of the silica to said binder in said suspension being from 1:1 to 3:1, and the combined amount of said casein salt and silica being from 5 to 17.5% of the aqueous suspension, said finely divided non-colloidal silica being dehydrated silicic acid precipitated from aqueous solution, having a particle size range from 1 to 10 microns and a weight average particle size of 2 to 4 microns, drying the coating, and impregnating the resulting coated surface with a two-component diazotype sensitizing composition containing a light-sensitive diazo compound and an azo coupling component containing a hydroxyl group selected from the class consisting of phenolic and enolic hydroxyl groups.

6. A process of preparing diazotype photoprinting material, which comprises precoating a paper base material with a suspension of non-colloidal finely divided silica in a 1 to 10% aqueous solution of a film-forming condensation product of a resinous formaldehyde-dicyandiamide condensation product adapted to act as a binder, said condensation product being capable of reacting with an azo dye coupling component containing a hydroxyl group selected from the class consisting of phenolic and enolic hydroxyl groups the weight ratio of the silica to said binder in said suspension being from 1:1 to 3:1, and the combined amount of said binder material and silica being from 5 to 17.5% of the aqueous suspension, said finely divided non-colloidal silica being dehydrated silicic acid precipitated from aqueous solution, having a particle size range from 1 to 10 microns and a weight average particle size of 2 to 4 microns, drying the coating, and impregnating the resulting coated surface with a two-component diazotype sensitizing composition containing a light-sensitive diazo compound and an azo coupling component containing a hydroxyl group selected from the class consisting of phenolic and enolic hydroxyl groups.

7. Diazotype photoprinting material which comprises base material having a dried coating of non-colloidal finely divided silica together with a film-forming lyophile basic-to-amphoteric nitrogenous binder, capable of reacting with an azo dye coupling component containing a hydroxyl group selected from the class consisting of phenolic and enolic hydroxyl groups the weight ratio of silica to said binder being from 1:1 to 3:1, said finely divided non-colloidal silica being dehydrated silicic acid precipitated from aqueous solution, having a particle size range from 0.1 to 10 microns and a weight average particle size of 1 to 5 microns, the surface of said coating being impregnated with a two-component diazotype sensitizing composition containing a light-sensitive diazo compound and an azo coupling component containing a hydroxyl group selected from the class consisting of phenolic and enolic hydroxyl groups.

8. Diazotype photoprinting material as defined in claim 7, wherein the binder is a water-soluble film-forming synthetic nitrogenous anion exchange resin.

9. Diazotype photoprinting material as defined in claim 7, wherein the binder is a water-soluble film-forming protein compound.

10. Diazotype photoprinting material as defined in claim 7, wherein said average particle size of said finely divided silica is from 2 to 4 microns.

11. Diazotype photoprinting material which comprises paper base material having thereon a dried continuous surface coating of non-colloidal finely divided silica together with a water-soluble alkali metal casein salt as a binder, said salt being capable of reacting with an azo dye coupling component containing a hydroxyl group selected from the class consisting of phenolic and enolic hydroxyl groups the weight ratio of silica to said binder being from 1:1 to 3:1, said finely divided non-colloidal silica being dehydrated silicic acid precipitated from aqueous solution, having a particle size range from 1 to 10 microns and a weight average particle size of 2 to 4 microns, the surface of said coating being impregnated with a two-component diazotype sensitizing composition containing a light-sensitive diazo compound and an azo coupling component containing a hydroxyl group selected from the class consisting of phenolic and enolic hydroxyl groups.

12. Diazotype photoprinting material which comprises paper base material having thereon a dried continuous surface coating on non-colloidal finely divided silica together with a water-soluble resinous formaldehyde-dicyandiamide condensation product as a binder, said condensation product being capable of reacting with an azo dye coupling component containing a hydroxyl group selected from the class consisting of phenolic and enolic hydroxyl groups the weight ratio of silica to said binder being from 1:1 to 3:1, said finely divided non-colloidal silica being dehydrated silicic acid precipitated from aqueous solution, having a particle size range from 1 to 10 microns and a weight average particle size of 2 to 4 microns, the surface of said coating being impregnated with a two-component diazotype sensitizing composition containing a light-sensitive diazo compound and an azo coupling component containing a hydroxyl group selected from the class consisting of phenolic and enolic hydroxyl groups.

JOHN SULICH, Jr.
JOSEPH E. FREDERICK.

References Cited in the file of this patent

UNITED STATES PATENTS

| Number | Name | Date |
| --- | --- | --- |
| 2,317,521 | Crowley et al. | Apr. 27, 1943 |
| 2,322,037 | Lindquist | June 15, 1943 |
| 2,433,515 | Jahoda | Dec. 30, 1947 |
| 2,566,709 | Von Glahn et al. | Sept. 4, 1951 |

FOREIGN PATENTS

| Number | Country | Date |
| --- | --- | --- |
| 318,511 | Great Britain | Aug. 7, 1930 |